(12) United States Patent
Balakrishnan

(10) Patent No.: US 9,870,430 B2
(45) Date of Patent: *Jan. 16, 2018

(54) LOCATION-INDEPENDENT LINKS TO CONTENT AT ONLINE CONTENT MANAGEMENT SYSTEMS

(71) Applicant: Dropbox, Inc., San Francisco, CA (US)

(72) Inventor: Ramesh Balakrishnan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,694

(22) Filed: Nov. 11, 2016

(65) Prior Publication Data

US 2017/0124212 A1 May 4, 2017

Related U.S. Application Data

(63) Continuation of application No. 14/079,315, filed on Nov. 13, 2013, now Pat. No. 9,501,579.

(51) Int. Cl.
*G06F 17/30* (2006.01)

(52) U.S. Cl.
CPC .. *G06F 17/30893* (2013.01); *G06F 17/30091* (2013.01); *G06F 17/30194* (2013.01); *G06F 17/30887* (2013.01)

(58) Field of Classification Search
CPC ......... G06F 17/30569; G06F 17/30873; G06F 17/30899; G06F 17/30867; G06F 17/30887; G06F 17/30893
See application file for complete search history.

(56) References Cited

U.S. PATENT DOCUMENTS

| | | | |
|---|---|---|---|
| 7,970,891 B1 * | 6/2011 | Kontothanssis | G06F 17/30887 705/14.41 |
| 8,219,134 B2 * | 7/2012 | Maharajh | G06F 17/30035 455/3.01 |
| 2007/0100834 A1 * | 5/2007 | Landry | G06F 17/30575 707/999.01 |
| 2009/0307602 A1 * | 12/2009 | Brewer | G06Q 10/10 715/744 |
| 2010/0138387 A1 * | 6/2010 | Simelius | G06F 17/30174 707/624 |
| 2012/0036213 A1 | 2/2012 | Tiu et al. | |

* cited by examiner

*Primary Examiner* — Dinku Gebresenbet
(74) *Attorney, Agent, or Firm* — Polsinelli PC

(57) ABSTRACT

The disclosed embodiments provide a system that facilitates access to content. During operation, the system tracks a content item at an online content management system using an identifier for the content item. Next, the system uses the identifier to provide a link to the content item, wherein the link enables access to the content item from an electronic device independently of a location of the content item within the online content management system.

16 Claims, 5 Drawing Sheets

LOCATION-INDEPENDENT LINKS TO CONTENT AT ONLINE CONTENT MANAGEMENT SYSTEMS

CROSS-REFERENCE TO RELATED APPLICATIONS

This application is a continuation of U.S. patent application Ser. No. 14/079,315, filed on Nov. 13, 2013, entitled, "LOCATION-INDEPENDENT LINKS TO CONTENT AT ONLINE CONTENT MANAGEMENT SYSTEMS"; which is hereby expressly incorporated herein by reference in its entirety.

BACKGROUND

Field

The disclosed embodiments relate to techniques for managing access to content. More specifically, the disclosed embodiments relate to techniques for providing location-independent links to content at online content management systems.

Related Art

Content on electronic devices is commonly synchronized, stored, shared, and/or backed up on online content management systems such as file hosting services, cloud storage services, and/or remote backup services. For example, images, audio, video, documents, executables, and/or other types of content may be stored on a network-enabled electronic device such as a personal computer, laptop computer, portable media player, tablet computer, and/or mobile phone. A user of the electronic device may also have a user account with a cloud storage service that allows copies of the content to be stored and/or backed up with the cloud storage service. The cloud storage service may further transmit the copies to other electronic devices of the user and/or other users who are authorized to access the files, thus synchronizing the content between the cloud storage service and electronic devices.

However, changes to names and/or locations of content on online content management systems may not be propagated to links to the content. For example, a first user may share a file on a cloud storage service with a second user by providing a link to the file to the other user. The second user may then access (e.g., download) the file by selecting and/or activating the link. On the other hand, the link may be broken if the first user deletes the file, moves the file, renames the file, and/or otherwise changes the file's location (e.g., path) on the cloud storage service. Continued access to the file by the second user may thus require the first user to provide an updated link to the file, which may be inconvenient and/or tedious to one or both users.

Consequently, access to content at online content management systems may be facilitated by location-independent mechanisms for linking to the content.

SUMMARY

The disclosed embodiments provide a system that facilitates access to content. During operation, the system tracks a content item at an online content management system using an identifier for the content item. Next, the system uses the identifier to provide a link to the content item, wherein the link enables access to the content item from an electronic device independently of a location of the content item within the online content management system.

In some embodiments, tracking the content item at the online content management system using the identifier involves maintaining a mapping of the identifier to the location of the content item.

In some embodiments, maintaining the mapping of the identifier to the location of the content item involves updating the mapping based on a change associated with at least one of:

(i) renaming of the content item;
(ii) moving of the content item;
(iii) deletion of the content item from a user account with the online content management system; and
(iv) copying of the content item.

In some embodiments, tracking the content item at the online content management system using the identifier further involves updating the online content management system with the change after the mapping is updated.

In some embodiments, updating the mapping based on the change involves writing the mapping to a previous version of the mapping, and writing the change to the mapping.

In some embodiments, using the identifier to provide the link to the content item involves:

(i) storing the identifier on the electronic device;
(ii) attempting to access the content item using the stored identifier and the mapping; and
(iii) upon detecting a failure to access the content item using the mapping, using the previous version of the mapping to access the content item.

In some embodiments, storing the identifier on the electronic device involves encrypting the identifier using a key associated with a user of the electronic device.

In some embodiments, the link is provided based on user input associated with the content item.

In some embodiments, the user input specifies at least one of enabling of the link and disabling of the link.

BRIEF DESCRIPTION OF THE FIGURES

In the figures, like reference numerals refer to the same figure elements.

DETAILED DESCRIPTION

Figure 1:
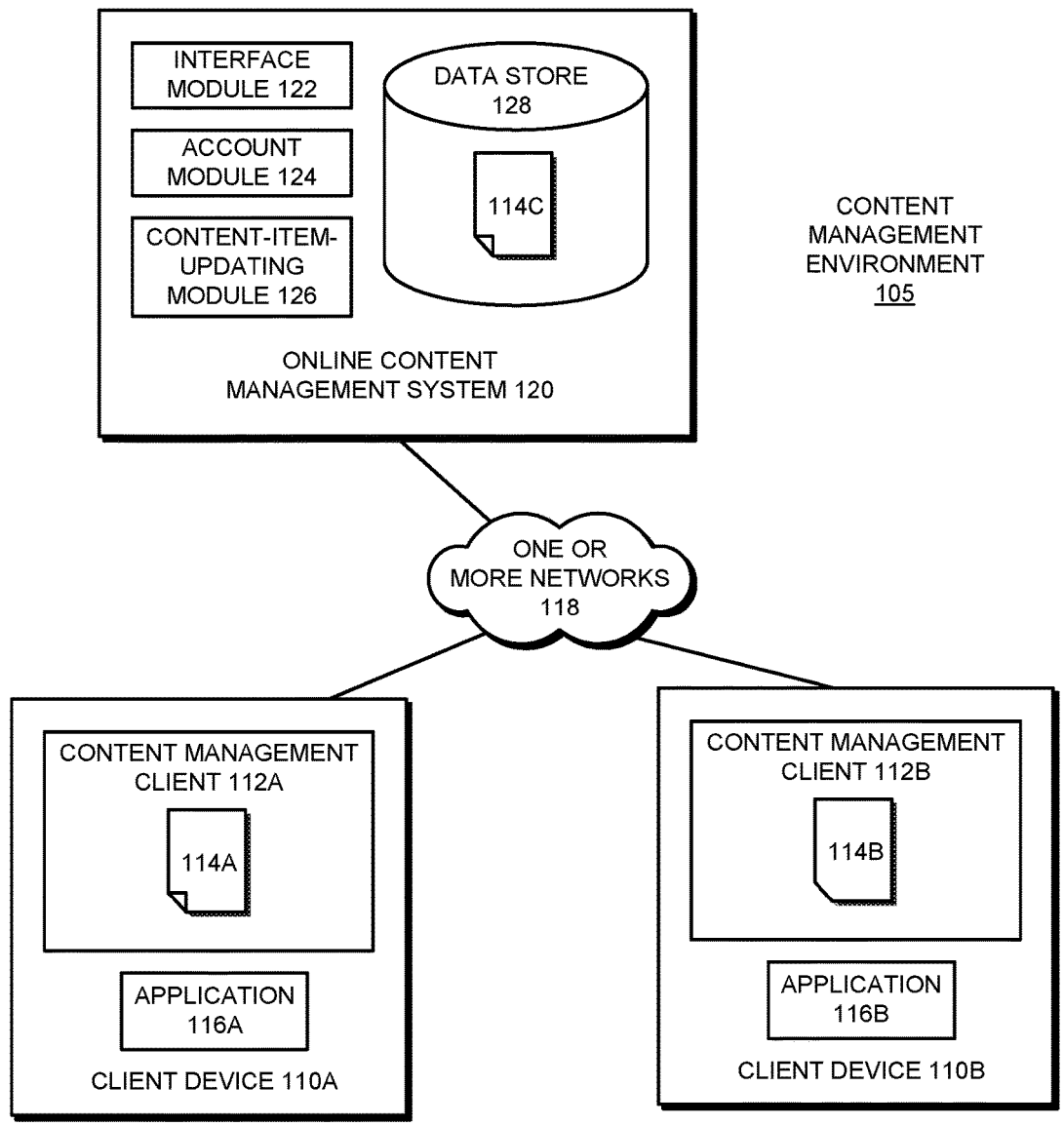
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating access to content. The content may include executables, documents, images, audio, video, and/or other files that may be accessed and/or viewed from electronic devices such as personal computers, laptop computers, tablet computers, mobile phones, personal digital assistants, portable media players, and/or digital media receivers. The content may also be synchronized between the electronic devices and an online content management system that provides a file hosting service, cloud storage service, and/or remote backup service to users of the electronic devices. For example, the online content management system may allow users of the electronic devices to store, share, and/or backup content from the electronic devices.

More specifically, the disclosed embodiments provide a method and system for providing location-independent links to the content at the online content management system. Each content item (e.g., file, directory, sub-directory, container, and/or other data item) at the online content management system may be associated with a unique identifier, which is used to track the content item. For example, a mapping of the identifier to the content item's location may be maintained and/or updated based on changes associated with renaming of the content item, moving of the content item, editing of the content item, deletion of the content item from a user account with the online content management system, and/or copying of the content item. The identifier may also be used to provide a link to the content item independently of the content item's location. For example, the link may specify the identifier, and the identifier may be used to retrieve the mapping and locate the content item. Consequently, the link may remain valid until the link is disabled by the online content management system.

FIG. 1 shows a schematic of a system in accordance with the disclosed embodiments. As shown in FIG. 1, the system corresponds to a content management environment 105, which includes a set of client devices 110A and 110B (collectively 110) and an online content management system 120 interconnected by one or more networks 118. Networks 118 may include a local area network (LAN), wide area network (WAN), personal area network (PAN), virtual private network, intranet, cellular network, WiFi network, Bluetooth (Bluetooth™ is a registered trademark of Bluetooth SIG, Inc.) network, universal serial bus (USB) network, and/or Ethernet network. Various aspects of client devices 110 and online content management system 120 are discussed below.

Each client device 110 may selectively execute a content management client application 112A and 112B (collectively 112) (also referred to as a "content management client") that may be used to access content items stored within online content management system 120. While only two client devices 110A and 110B are shown in FIG. 1 for purposes of clarity, those skilled in the art will appreciate that many client devices 110 may simultaneously connect through network(s) 118 to online content management system 120 at any given time. Examples of suitable client devices 110 include, but are not limited to, personal computers; mobile computing devices, such as laptop computers and/or tablet computers; handheld devices, such as a smartphone (e.g., an IPHONE®, BLACKBERRY®, or ANDROID™-based smartphone), personal digital assistant, and/or portable media player; digital media receivers; and/or other network-enabled electronic devices.

In one or more embodiments, content management client application 112 supports automatic synchronization between client devices 110 and online content management system 120. For example, content management client application 112 may automatically synchronize changes associated with a designated directory (e.g., new, deleted, modified, copied, and/or moved files and/or subdirectories within the directory) between each client device 110 and online content management system 120. To perform such synchronization, content management client application 112 may monitor a local directory corresponding to the designated directory on client devices 110 and synchronize changes to the local directory with a remote directory corresponding to the designated directory on online content management system 120. Conversely, content management client application 112 may identify changes to the remote directory and propagate the changes to the local directory.

Synchronized copies of a content item 114A, 114B and 114C may thus be maintained on client devices 110A and 110B and within online content management system 120, respectively. Alternatively, client devices 110 may provide a file-browser type interface (not shown) for directly manipulating the content items stored on online content management system 120 without maintaining a local copy. Client devices 110 may also include applications 116A and 116B (collectively 116) that manipulate copies of content items 114A and 114B. For example, applications 116 may be used to create, modify, process, and/or otherwise use documents, images, video, audio, and/or other content items (e.g., content items 114) on client devices 110.

Each client device 110 may store a local, synchronized copy of a content item from online content management system 120 in any suitable format. When content management client application 112 presents content items that are stored within online content management system 120 to a user, the content items may be arranged in directories, which may be arranged in other directories, or in any other arbitrary arrangement and/or directory structure supported by online content management system 120 and/or determined by the user. Consequently, each user's content item storage architecture may be considerably different from the next, and in some instances, the content item storage architecture may be implemented to maximize storage and content item retrieval efficiency.

Online content management system 120 stores content items and manages access to those content items via client devices 110. Online content management system 120 and its components may be implemented using any appropriate hardware and software that supports file serving, storage, and retrieval functions. For example, online content management system 120 may be implemented using one or more servers, cloud storage, network-attached storage (NAS), a storage area network (SAN), a redundant array of inexpensive disks (RAID) system, and/or other network-accessible storage. Online content management system 120 may additionally store the content items using a variety of filesystem architectures and/or hierarchies and obscure the locations and/or mechanisms involved in storing the data from client devices 110.

As shown in FIG. 1, online content management system 120 includes an interface module 122, an account module 124, a content-item-updating module 126, and a data store 128. The components of online content management system 120 are discussed below.

Interface module 122 may facilitate content item access and content item storage operations among online content management system 120 and client devices 110. Interface module 122 may receive content items from and send content items to client devices 110 consistent with each user's preferences for sharing content items. Interface module 122 may also act as the counterpart to a client-side file-explorer style user interface that allows a user to manipulate content items directly stored on online content management system 120.

In one or more embodiments, software on client devices 110 may integrate network-stored content items with the client's local filesystem to enable the user to manipulate network-stored content items through the same user interface (UI) used to manipulate content items on the local filesystem, such as through a file explorer, file finder, file chooser, and/or browser application. As an alternative or supplement to the client-side file-explorer interface, interface module 122 may provide a web interface for client devices 110 to access (e.g., via application 116) and allow the user to manipulate content items stored within online content management system 120. In this way, the user can directly manipulate content items stored within online content management system 120.

Data store 128 may store content items such as those uploaded using client devices 110 and/or other suitable electronic devices. In the embodiment illustrated in FIG. 1, client device 110A, which is associated with a first user, is shown as locally storing at least one content item 114A, and client device 110B, which is associated with a second user, is shown as locally storing at least one content item 114B. A copy of the locally stored content item 114C may also be maintained in data store 128 of online content management system 120. Consequently, content items 114A, 114B and 114C may be local versions of the same shared document that reside on client device 110A, client device 110B and online content management system 120, respectively. Note that client devices 110A and 110B may also store other content items that are replicated on online content management system 120, but are not shared with other client devices.

Data store 128 may maintain information identifying the user, information describing the user's file directory, and/or other information in a file journal that is maintained for each user. The file journal may be maintained on online content management system 120 and/or as a "server-side file journal" on both online content management system 120 and locally on each client device 110. The file journal may be used to synchronize various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within online content management system 120 and the copy of the content item 114B on client device 110B. Similarly, any changes that are made to content item 114C on online content management system 120 may also be automatically reflected in the copy of content item 114A stored on client device 110A, and the copy of content item 114B stored on client device 110B.

Moreover, content items 114A and 114B may be stored in local caches within content management clients 112A and 112B, respectively. Alternatively, content items 114A and 114B may be stored in local filesystems within content management clients 112A and 112B. In some situations, content items 114A and 114B are stored in filesystem space that is reserved for content management clients 112A and 112B. In other situations, content items 114A and 114B are stored in normal filesystem space that is not reserved for content management clients 112A and 112B.

Account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all content items among his/her desktop computer, tablet computer, and mobile device. To make such a sharing arrangement seamless to the user, the user's single account on online content management system 120 may be associated with each of the user's respective client devices. An application running on each respective client device 110 may help to coordinate synchronization of content items on the client device with corresponding versions of the content items within the user's account in online content management system 120 and/or on the user's various other client devices.

Content-item-updating module 126 may maintain consistency among different copies (versions) of a content item 114A, 114B and 114C that are located in client device 110A, client device 110B and online content management system 120, respectively. This can be complicated, because the different versions 114A, 114B and 114C of the same shared content items may be simultaneously changed at client devices 110A-B and online content management system 120. Hence, online content management system 120 may enforce an updating policy to resolve conflicting updates to different versions of the same content item. For example, the copy of content item 114C on online content management system 120 may be designated as the master copy, and updates to copies 114A and 114B of the content item may be serialized and applied one-at-a-time to the master copy 114C before being propagated back to copies 114A and 114B located on client devices 110A and 110B.

In one or more embodiments, content management environment 105 includes functionality to facilitate access to content items in online content management system 120 from client devices 110. More specifically, online content management system 120 may provide location-independent links that enable access to the content items from client devices 110. As discussed in further detail below, the location-independent links may be implemented using mappings of unique identifiers for the content items to the content items' locations within online content management system 120. In turn, the location-independent links may direct client devices 110 to the corresponding content items even if the content items are moved, renamed, copied, edited, and/or deleted from user accounts with online content management system 120.

Figure 2:
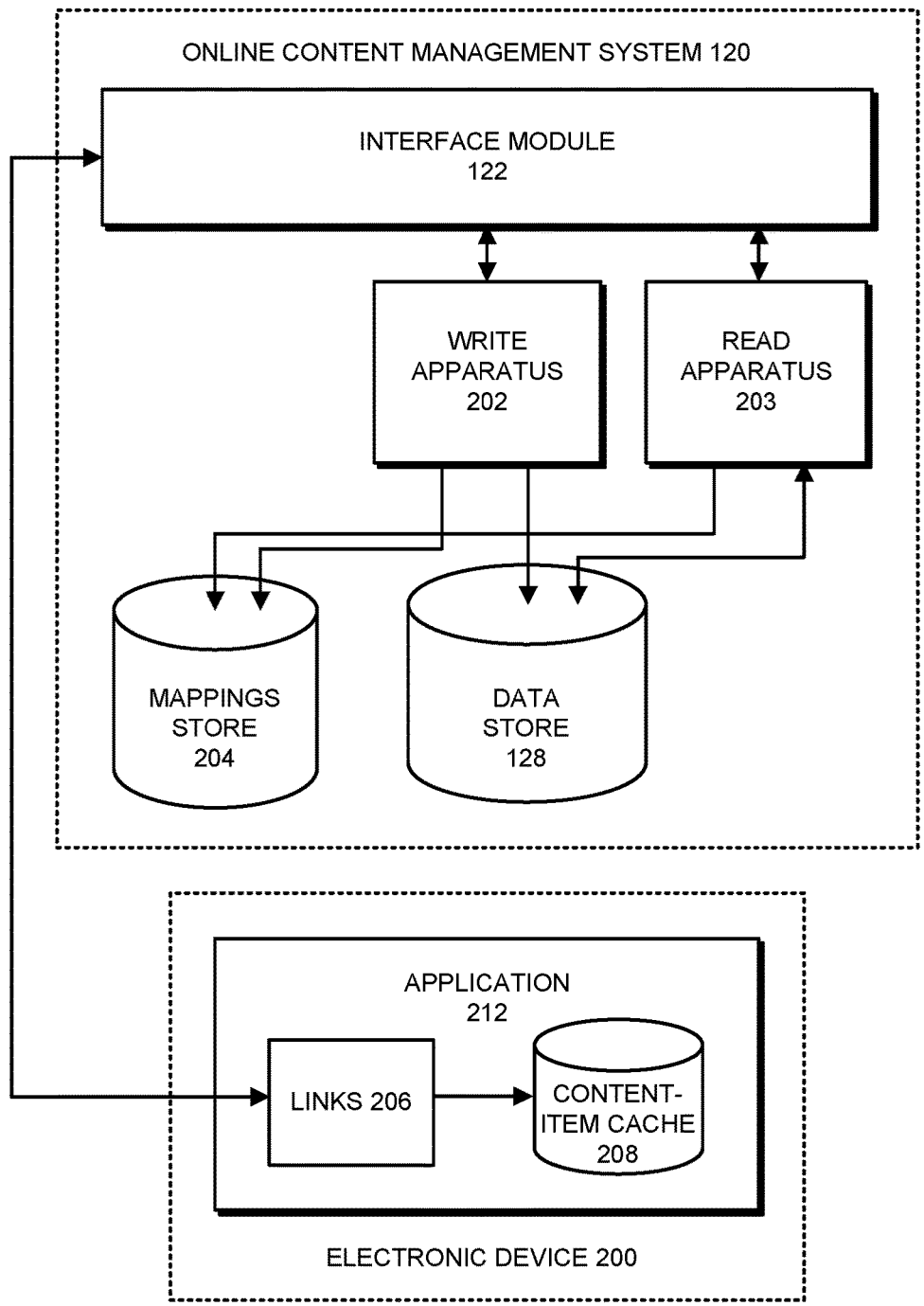
FIG. 2 shows a system for facilitating access to content in accordance with the disclosed embodiments.

FIG. 2 shows a system for facilitating access to content in accordance with the disclosed embodiments. As mentioned above, users typically interact with online content management system 120 through an application 212 on an electronic device 200, such as content management client applications 112 and/or applications 116 executing on client devices 110 of FIG. 1. To facilitate these user interactions, application 212 may provide one or more links 206 to content items stored on online content management system 120.

More specifically, links 206 may allow the content items to be accessed from electronic device 200 independently of the locations of the content items within online content management system 120. For example, links 206 may remain valid after changes to the names, paths, copies, and/or contents of the content items have been made. Links 206 may further be used to access the content items and/or copies of the content items after the content items are deleted from one or more user accounts with online content management system 120. In turn, application 212 and/or electronic device 200 may use links 206 to display the corresponding content items to a user and/or copy the content items to a content-item cache 208 on electronic device 200.

Prior to use of links 206 by the user, application 212 may verify that the user is logged into online content management system 120. If the user is not logged into online content management system 120, application 212 may provide a dialog box and/or one or more other user-interface elements that allow the user to provide authentication credentials (e.g., username and password) for a user account and/or create a user account with online content management system 120.

Once the user is authenticated with online content management system 120, application 212 may enable access to the user's content items with online content management system 120. For example, application 212 may allow the user to navigate a hierarchical directory structure containing directories, subdirectories, files, and/or other content items associated with the user account through a file chooser. Application 212 may also provide a "saved links" and/or "collections" feature that enables direct access to the content items through links 206 without navigating the directory structure.

To enable use of links 206 independently of the corresponding content items' locations, a write apparatus 202 in online content management system 120 may track each content item using an identifier for the content item. Write apparatus 202 may be implemented by content-item-updating module 126 of FIG. 1 and/or another component that handles writes to content items in online content management system 120. After a content item is added to data store 128 and/or online content management system 120, write apparatus 202 may assign a universally unique identifier (UUID), globally unique identifier (GUID), and/or other distinct identifier to the content item. For example, write apparatus 202 may use a 128-bit number to uniquely identify the content item within online content management system 120.

Write apparatus 202 may also maintain a mapping of the identifier to the location of the content item in a mappings store 204 within online content management system 120. For example, write apparatus 202 may map the identifier to the path and filename of the content item using one or more tables in a relational database. If a copy of the content item is made, write apparatus 202 may propagate the same identifier to the copy and use the identifier to map to the path and filename of the copy. In other words, write apparatus 202 may use the same identifier to track multiple copies of a content item.

Moreover, write apparatus 202 may ensure that any changes to the content item are reflected in the mapping, including renaming of the content item, moving of the content item, deletion of the content item from a user account with the online content management system, and/or copying of the content item. For example, write apparatus 202 may receive a request to move and/or rename the content item from "/A/1.jpg" to "/B/2.jpg" through interface module 122. In response to the request, write apparatus 202 may retrieve the mapping for the content item from mappings store 204 and change the location of the content item in the mapping from "/A/1.jpg" to "/B/2.jpg." During such updates to the mapping, write apparatus 202 may maintain the same identifier for the content item to enable tracking of the content item using the identifier across changes to the name, location, contents, users, and/or copies of the content item.

In one or more embodiments, write apparatus 202 coordinates updates to data store 128, mappings store 204, and/or other stores of data and/or metadata associated with the content item by performing "optimistic" writes to mappings store 204. During an "optimistic" write, write apparatus 202 may update the mapping with a change to the content item before updating data store 128 and/or online content management system 120 with the change. As a result, the update to the mapping may be made under the assumption that the subsequent update to online content management system 120 succeeds. However, if the subsequent update fails, the content item's name and/or location in the mapping may be inconsistent with the state of online content management system 120.

To handle such inconsistencies, write apparatus 202 may keep a previous version of the mapping for the content item in mappings store 204. In turn, write apparatus 202 may update the mapping with a change by writing the mapping to the previous version of the mapping before writing the change to the mapping. If the change subsequently fails in a server file journal and/or other repository containing state information for online content management system 120, online content management system 120 may fall back on the previous version of the mapping to locate the content item.

More specifically, a read apparatus 203 in online content management system 120 may provide a location-independent link (e.g., links 206) to a content item by processing read requests from electronic device 200 and/or other electronic devices using the link. For example, read apparatus 203 may correspond to a content-item-accessing module that coordinates read accesses to content items in online content management system 120.

To enable read accesses from the electronic device(s) using the link, read apparatus 203 may store the identifier for the content item on electronic device 200. For example, read apparatus 203 may transmit the link to application 212 as a hyperlink containing the identifier, and application 212 may store the hyperlink and/or identifier in content-item cache 208 and/or another repository on electronic device 200.

Application 212 may further encrypt the stored identifier using a key associated with the user of the electronic device to obscure the source of the content item. For example, the identifier may be encrypted using two different keys on two different electronic devices of two different users to prevent an attacker from discerning that the encrypted identifiers on the electronic devices refer to the same content item.

Upon receiving a read request for the content item through the link, read apparatus 203 may attempt to access the content item using the identifier (e.g., as obtained from the read request and/or link) and the corresponding mapping for the content item from mappings store 204. If the mapping is consistent with the state of online content management system 120, read apparatus 203 may be able to read the content item at the location stated in the mapping. Conversely, if the mapping is not consistent with the state of online content management system 120 (e.g., if a change is made to the mapping but a subsequent, corresponding change to the state of online content management system 120 fails), read apparatus 203 may not be able to access the content item at the location. As a result, read apparatus 203 may use the previous version of the mapping to access the content item upon detecting a failure to access the content item using the mapping. Resolving inconsistencies between mappings of content items and states of online content management systems containing the content items is discussed in further detail below with respect to FIG. 3.

Finally, write apparatus 202 and/or read apparatus 203 may enable and/or disable links 206 based on user input associated with the corresponding content items. For example, write apparatus 202 and/or read apparatus 203 may provide a location-independent link to a content item after receiving a request to enable the link from a user associated with creating and/or uploading a content item and/or a user with whom the content item is shared. On the other hand, write apparatus 202 and/or read apparatus 203 may disable access to the content item through the link after receiving a subsequent request from the user(s) to disable sharing of the content item, delete the content item from one or more user accounts at online content management system 120, and/or otherwise disable the location-independent functionality of the link.

Consequently, the use of identifiers to track content items at online content management system 120 and provide location-independent links to the content items may facilitate access to the content items from electronic device 200. For example, the links may allow a user of electronic device 200 to access a photo album containing a collection of images from a set of other users, independently of changes to the images' names, locations, copies, and/or contents made by the user and/or other users. Similarly, the identifiers and/or links may allow the user to locate and/or identify the corresponding content items without navigating a directory structure containing the content items, thus streamlining the user's use of both application 212 and online content management system 120.

Those skilled in the art will appreciate that the system of FIG. 2 may be implemented in a variety of ways. As mentioned above, online content management system 120 may utilize a number of storage mechanisms and/or filesystem architectures to provide data store 128 and/or mappings store 204. In addition, mappings for the content items may be stored as metadata for the content items in data store 128 instead of in a separate mappings store 204. For example, if relational-database records within data store 128 include the content items and metadata related to the content items' locations, mappings for the content items may be created from fields in the relational-database records corresponding to the content items' identifiers and the content items' locations.

Figure 3:
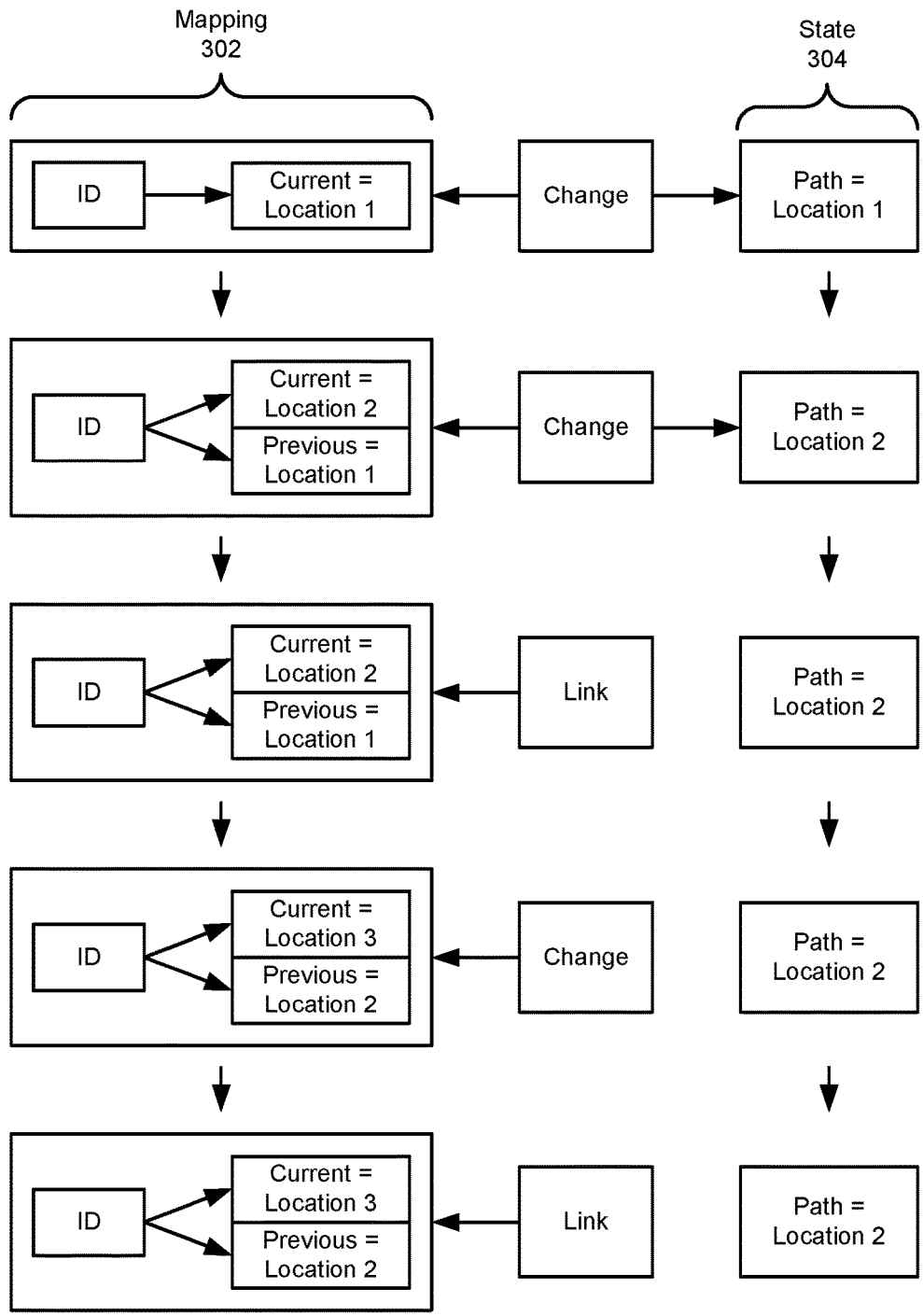
FIG. 3 shows an exemplary tracking of a content item at an online content management system in accordance with the disclosed embodiments.

FIG. 3 shows an exemplary tracking of a content item at an online content management system (e.g., online content management system 120 of FIG. 1) in accordance with the disclosed embodiments. The tracking may begin with a change corresponding to the creation of the content item at the online content management system. For example, the change may cause the content item to be created at and/or uploaded to a first location (e.g., "Location 1") within the online content management system. In addition, the change may result in the creation of an identifier (e.g., "ID") for the content item, as well as a mapping of the identifier to the first location (e.g., "Current=Location 1"). After mapping 302 is created, a state 304 of the online content management system is updated with the change. For example, the change may be added to state 304 as an entry to a server-side file journal for the online content management system, with the entry setting the path of the content item to the first location (e.g., "Path=Location 1").

Next, a second change may be made to the content item. For example, the second change may cause the content item to be moved from the first location to a second location (e.g., "Location 2") within the online content management system. In turn, the change may be propagated across the online content management system by writing the first location to a previous version of mapping 302 (e.g., "Previous=Location 1"), writing the change to mapping 302 (e.g., "Current=Location 2"), and then updating state 304 with the change (e.g., "Path=Location 2").

After the second change is made, the content item is accessed through a location-independent link to the content item. To access the content item, the identifier may be obtained from the link and matched to mapping 302, and the content item may be read from the location specified in mapping 302 (e.g., "Location 2").

On the other hand, a subsequent change to the content item may fail at the online content management system. For example, the change may be received as a request to move the content item from the second location to a third location (e.g., "Location 3") within the online content management system. During processing of the change, mapping 302 may be "optimistically" updated with the change, while a subsequent attempt to update state 304 with the change may fail. Mapping 302 may thus indicate that the content item is currently located at the third location (e.g., "Current=Location 3") and was previously located at the second location (e.g., "Previous=Location 2"), and state 304 may specify that the content item is located at the second location (e.g., "Path=Location 2").

In turn, subsequent use of the link may result in a failure to access the content item using the current version of mapping 302 (e.g., "Location 3"). However, the existence of the previous version of mapping 302 may allow the content item to be accessed through the link at the location specified in state 304 (e.g., "Location 2"). In other words, the previous version of mapping 302 may provide a fallback for the inconsistency between the current version of mapping 302 and state 304. The inconsistency may then be resolved by reverting the current version of the mapping to the second location or making one or more additional attempts to update state 304 so that the content item's path refers to the third location.

Figure 4:
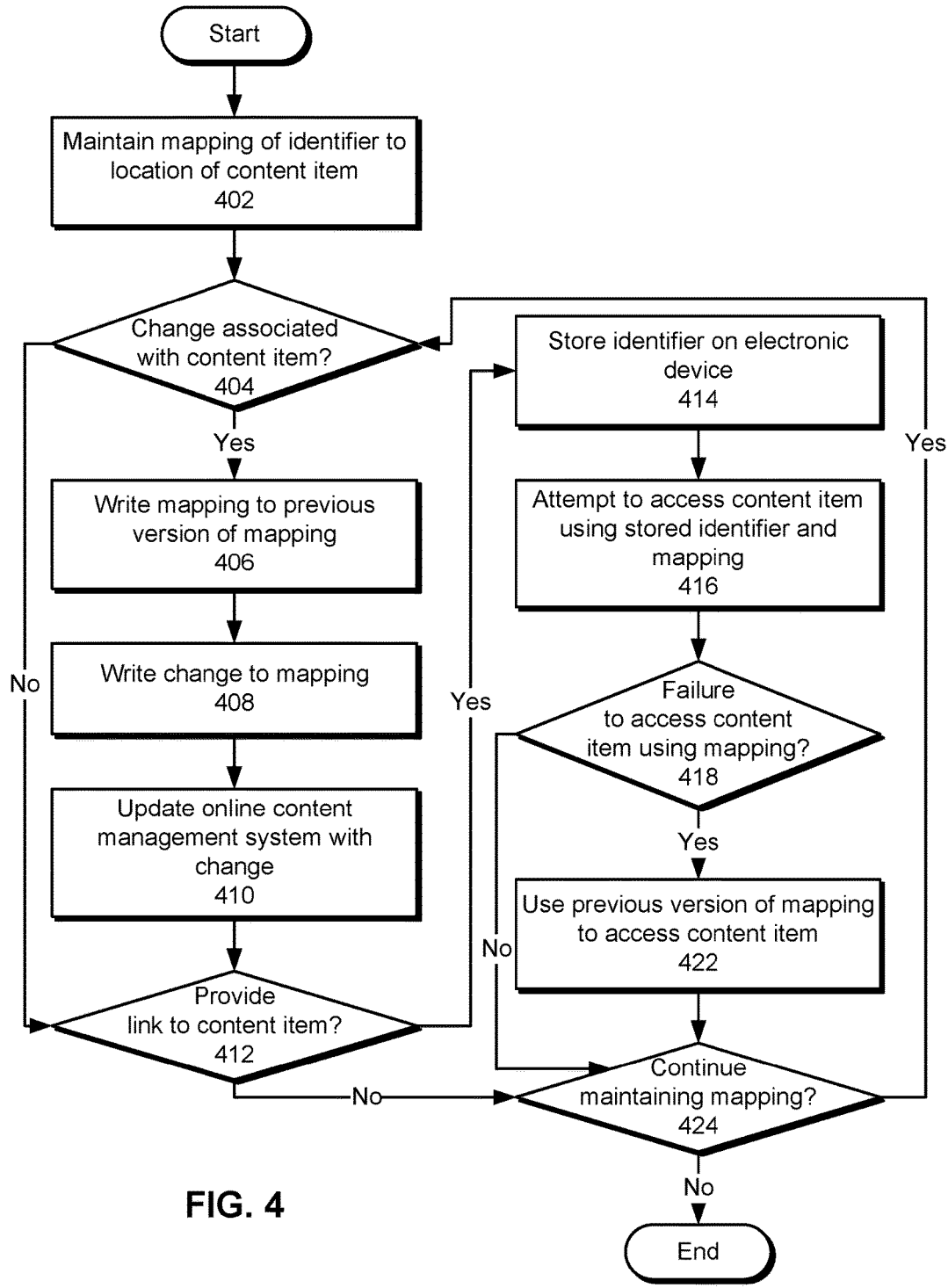
FIG. 4 shows a flowchart illustrating the process of facilitating access to content in accordance with the disclosed embodiments.

FIG. 4 shows a flowchart illustrating the process of facilitating access to content in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, a content item at an online content management system is tracked using an identifier for the content item. To track the content item, a mapping of the identifier to the location of the content item is maintained (operation 402). For example, the mapping may map a 128-bit value that uniquely identifies the content item to a path and filename of the content item within the online content management system. The mapping may also be updated based on a change associated with the content item (operation 404), such as renaming of the content item, moving of the content item, deletion of the content item from a user account with the online content management system, and/or copying of the content item. If the content item is not changed, the mapping is not updated.

If the content item is changed, the mapping is first written to a previous version of the mapping (operation 406), then the change is written to the mapping (operation 408), and finally the online content management system is updated with the change (operation 410). Such updating of the mapping and previous version of the mapping before updating of the online content management system may facilitate efficient and/or effective resolution of inconsistencies between the mapping and the state of the online content management system.

A link to the content item may also be provided (operation 412). The link may enable access to the content item from an electronic device independently of a location of the content item within the online content management system. In addition, the link may be provided based on user input associated with the content item. For example, the link may not be provided if the user input specifies and/or requests disabling of the link. If the link is not to be provided, the mapping may continue to be maintained (operation 424) to facilitate subsequent use and/or enabling of the link.

On the other hand, the link may be provided if the user input specifies and/or requests enabling of the link and/or the content item is configured for use with the link by default. If the link is to be provided, the identifier is stored on the electronic device (operation 414). The identifier may also be encrypted using a key associated with a user of the electronic device to obscure the source of the content item. Next, an attempt is made to access the content item using the stored identifier and the mapping (operation 416). The attempt may fail (operation 418) if the mapping is inconsistent with the state of the online content management system. If the attempt is successful (e.g., the mapping is consistent with the state of the online content management system), the content item may continue to be accessed through the mapping.

If the attempt fails, the previous version of the mapping is used to access the content item (operation 422). For example, the mapping may be optimistically updated with a change to the content item, while a corresponding attempt to update the online content management system with the change may fail. While the mapping may not reflect the state of the online content management system, the previous version of the mapping may provide a fallback to the state of the online content management system and enable use of the link in accessing the content item.

The mapping may continue to be maintained (operation 424) during use of the content item with the online content management system. If the mapping is to be maintained, changes associated with the content item are used to update the mapping and online content management system (operations 404-410), and links to the content item are provided using the identifier and mapping (operations 412-422). The mapping may continue to be used to track the content item while the content item exists at the online content management system and/or location-independent links are used with content items in the online content management system.

Figure 5:
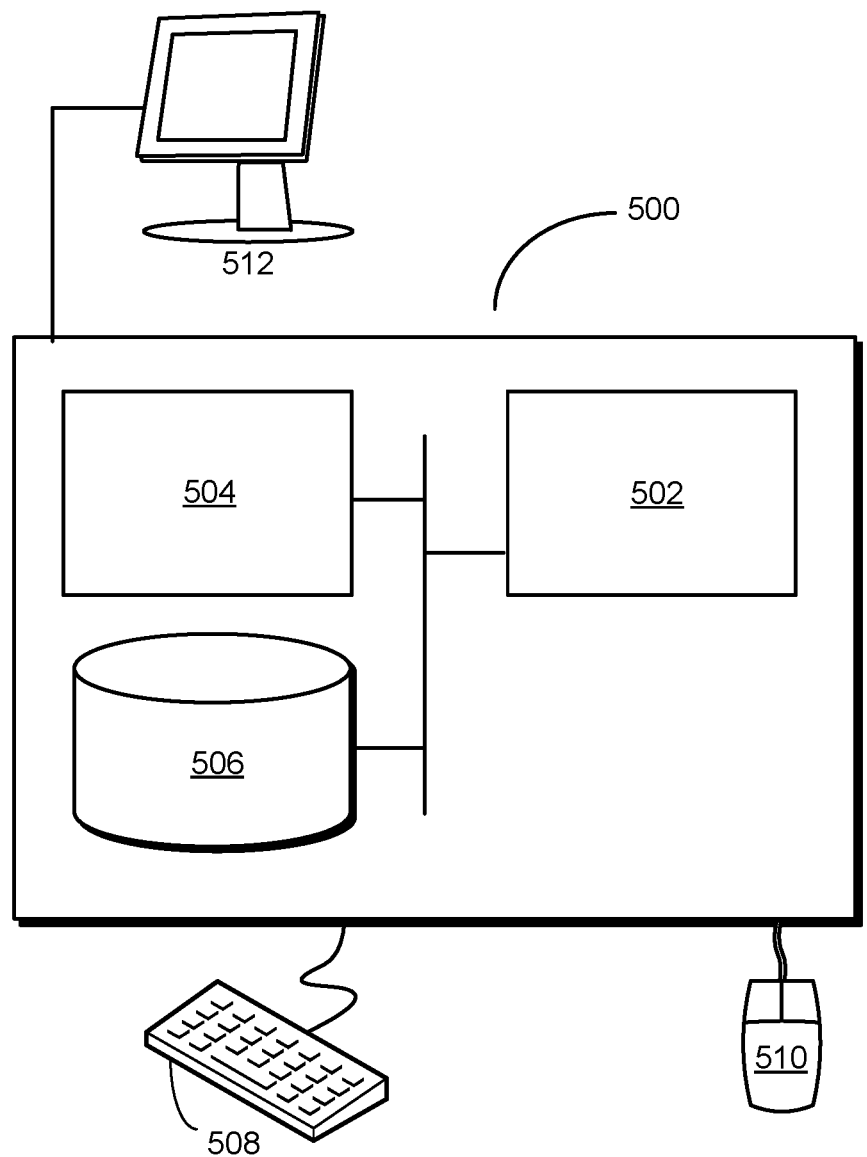
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating access to content. The system may include a write apparatus that tracks a content item at an online content management system using an identifier for the content item. For example, the write apparatus may maintain a mapping of the identifier to the location of the content item within the online content management system and/or update the mapping based on changes associated with the content item's name, location, and/or contents. The system may also include a read apparatus that uses the identifier to provide a link to the content item. The link may enable access to the content item from an electronic device independently of the location of the content item.

In addition, one or more components of computer system 500 may be remotely located and connected to the other components over a network. Portions of the present embodiments (e.g., write apparatus, read apparatus, electronic devices, etc.) may also be located on different nodes of a distributed system that implements the embodiments. For example, the present embodiments may be implemented using a cloud computing system that provides location-independent links to content items within an online content management system to a set of remote electronic devices.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating access to content, comprising:
responsive to receiving, at an online content management system, a content item associated with a user account:
storing the content item at a location within the online content management system,
creating a mapping of an identifier of the content item to the location, wherein the mapping comprises an entry within a table of a relational database of the online content management system, wherein the online content management system is configured to synchronize the content item with one or more client devices;

tracking the content item at the online content management system by updating the mapping based on a change to the content item; and using the identifier to provide a link to the content item, wherein the link enables access to the content item from an electronic device regardless of a change to the location of the content item within the online content management system, and wherein the location comprises a file path within a data store of the online content management system;

wherein tracking the content item at the online content management system comprises: responsive to a particular request, by the electronic device, to access the content item:

using the identifier to obtain the mapping from the table; extracting the file path from the mapping; and using the file path to provide, to the electronic device, access to the content item;

responsive to determining that the content item has been moved to a new file path:

writing the mapping to a previous version of the mapping; writing the new file path to the mapping; and moving the content item to the new file path within the data store; and responsive to a subsequent request, by the electronic device, to access the content item:

using the identifier to obtain the mapping from the table; extracting the new file path from the mapping; and using the new file path to provide, to the electronic device, access to the content item.

2. The computer-implemented method of claim 1, wherein the change to the content item comprises at least one of:
 renaming the content item;
 moving the content item;
 deleting the content item; or
 copying the content item.

3. The computer-implemented method of claim 1, wherein using the identifier to provide the link to the content item comprises:
 attempting to access the content item using the identifier and the mapping; and
 upon detecting a failure to access the content item using the mapping, using the previous version of the mapping to access the content item.

4. The computer-implemented method of claim 3, wherein storing the identifier on the electronic device comprises:
 encrypting the identifier using a key associated with a user of the electronic device.

5. The computer-implemented method of claim 1, wherein the link is provided based on user input associated with the content item.

6. The computer-implemented method of claim 5, wherein the user input specifies at least one of:
 enabling of the link; or
 disabling of the link.

7. An online content management system for facilitating access to content, comprising:
 a write apparatus configured to:
 responsive to receiving a content item associated with a user account;

storing the content item at a location within the online content management system,
 creating a mapping of an identifier of the content item to the location wherein the mapping comprises an entry within a table of a relational database of the online content management system, wherein the online content management system is configured to synchronize the content item with one or more client devices;

tracking the content item at the online content management system by updating the mapping based on a change to the content item; and a read apparatus configured to use the identifier to provide a link to the content item, wherein the link enables access to the content item from an electronic device regardless of a change to the location of the content item within the online content management system, and wherein the location comprises a file path within a data store of the online content management system;

wherein tracking the content item at the online content management system comprises: responsive to a particular request, by the electronic device, to access the content item:

using the identifier to obtain the mapping from the table; extracting the file path from the mapping; and using the file path to provide, to the electronic device, access to the content item;

responsive to determining that of the content item has been moved to a new file path:

writing the mapping to a previous version of the mapping; writing the new file path to the mapping; and moving the content item to the new file path within the data store; and responsive to a subsequent request, by the electronic device, to access the content item:

using the identifier to obtain the mapping from the table; extracting the new file path from the mapping; and
 using the new file path to provide, to the electronic device, access to the content item.

8. The system of claim 7, wherein the change to the content item comprises at least one of:
 renaming the content item;
 moving the content item; or
 deleting the content item.

9. The system of claim 8, wherein updating the mapping based on the change comprises:
 writing the mapping to a previous version of the mapping; and
 writing the change to the mapping.

10. The system of claim 9, wherein using the identifier to provide the link to the content item comprises:
 attempting to access the content item using the identifier and the mapping; and
 upon detecting a failure to access the content item using the mapping, using the previous version of the mapping to access the content item.

11. The system of claim 7, wherein the link is provided based on user input associated with the content item.

12. A non-transitory computer-readable storage medium storing instructions that when executed by a computer cause the computer to perform a method for facilitating access to content, the method comprising:
 responsive to receiving, at an online content management system, a content item associated with a user account:
 storing the content item at a location within the online content management system, creating a mapping of an identifier of the content item to the location, wherein the mapping comprises an entry within a table of a relational database of the online content management system, tracking the content item at the online content management system by updating the mapping based on a change the content item; and using the identifier to provide a link to the content item, wherein the link enables access to the content item from an electronic device regardless of a change to the location of the content item within the online content management system, and wherein the location comprises a file path within a data store of the online content management system;

wherein tracking the content item at the online content management system comprises: responsive to a particular request, by the electronic device, to access the content item:

using the identifier to obtain the mapping from the table; extracting the file path from the mapping; and using the file path to provide, to the electronic device, access to the content item;

responsive to determining that the content item has been moved to a new file path: writing the mapping to a previous version of the mapping; writing the new file path to the mapping; and moving the content item to the new file path within the data store; and responsive to a subsequent request, by the electronic device, to access the content item:

using the identifier to obtain the mapping from the table; extracting the new file path from the mapping; and using the new file path to provide, to the electronic device, access to the content item.

13. The non-transitory computer-readable storage medium of claim 12, wherein the change to the content item comprises at least one of:

renaming of the content item;

moving the content item; or deleting of the content item.

14. The non-transitory computer-readable storage medium of claim 13, wherein tracking the content item at the online content management system using the identifier further comprises:

updating the online content management system with the change after the mapping is updated.

15. The non-transitory computer-readable storage medium of claim 13, wherein updating the mapping based on the change comprises:

writing the mapping to a previous version of the mapping; and writing the change to the mapping.

16. The non-transitory computer-readable storage medium of claim 15, wherein using the identifier to provide the link to the content item comprises:

attempting to access the content item using the identifier and the mapping; and upon detecting a failure to access the content item using the mapping, using the previous version of the mapping to access the content item.

* * * * *